United States Patent
Kawasaki

(10) Patent No.: US 6,738,704 B2
(45) Date of Patent: May 18, 2004

(54) APPARATUS AND METHOD FOR JUDGING ROAD SURFACE GRADIENTS, AND PROGRAM FOR JUDGING GRADIENTS

(75) Inventor: Hiroaki Kawasaki, Kobe (JP)

(73) Assignee: Sumitomo Rubber Industries, Ltd., Hyogo-ken (JP)

( * ) Notice: Subject to any disclaimer, the term of this patent is extended or adjusted under 35 U.S.C. 154(b) by 0 days.

(21) Appl. No.: 10/174,939

(22) Filed: Jun. 20, 2002

(65) Prior Publication Data

US 2003/0033071 A1 Feb. 13, 2003

(30) Foreign Application Priority Data

Jun. 22, 2001 (JP) .......................... 2001-189403

(51) Int. Cl.⁷ ................................. B60T 8/58
(52) U.S. Cl. ........................................ 701/80
(58) Field of Search ................. 701/74, 80; 303/163, 303/191, 192

(56) References Cited

U.S. PATENT DOCUMENTS

| | | | | |
|---|---|---|---|---|
| 5,132,906 A | * | 7/1992 | Sol et al. | 701/80 |
| 5,703,776 A | * | 12/1997 | Soung | 701/65 |
| 6,188,316 B1 | * | 2/2001 | Matsuno et al. | 340/441 |
| 6,249,735 B1 | * | 6/2001 | Yamada et al. | 701/65 |
| 6,510,374 B1 | * | 1/2003 | Saotome et al. | 701/80 |
| 6,604,595 B2 | * | 8/2003 | Sakakiyama | 180/233 |

FOREIGN PATENT DOCUMENTS

| | | |
|---|---|---|
| JP | 04-145323 | 5/1992 |
| JP | 05-142021 | 6/1993 |
| JP | 06-144087 | 5/1994 |
| JP | 06-147304 | 5/1994 |
| JP | 06-63766 | 8/1994 |
| JP | 09-242862 | 9/1997 |

* cited by examiner

Primary Examiner—Michael J. Zanelli
(74) Attorney, Agent, or Firm—Birch, Stewart, Kolasch & Birch, LLP

(57) ABSTRACT

An apparatus for judging road surface gradients including a speed detector for periodically detecting wheel speeds of four wheels of a vehicle, a vehicle body speed calculator for obtaining a vehicle body speed of the vehicle, a slip rate calculator for obtaining a slip rate, a vehicle body acceleration calculator for obtaining an acceleration of the vehicle body of the vehicle, a determining device for determining whether the acceleration of the vehicle body is within a specified range proximate to zero, and a gradient judging device for judging a gradient of a road surface depending on the determination of the determining device. The gradients of road surfaces might be judged without using various sensors but only on the basis of information which can be obtained from a speed detector for detecting wheel speeds.

15 Claims, 4 Drawing Sheets

APPARATUS AND METHOD FOR JUDGING ROAD SURFACE GRADIENTS, AND PROGRAM FOR JUDGING GRADIENTS

BACKGROUND OF THE INVENTION

1. Field of the Invention

The present invention relates to an apparatus and method for judging road surface gradients as well as to a program for judging gradients. More particularly, it relates to an apparatus and method for judging road surface gradients and a program for judging gradients for judging gradients of the road surface on which the vehicle is running to thereby improve running performances.

2. Description of Background Art

Control is conventionally performed in a vehicle equipped with, for instance, an automatic transmission, that gear shifts on a high speed side of the automatic transmission are limited for improving dynamic performances when running uphill or that the gear shifts on the high speed side of the automatic transmission are limited for improving engine braking performances when running downhill. A road surface gradient detecting device for detecting gradients of the road surface on which the vehicle is running is employed for such control.

It is the case with conventional devices that accelerator openings and front and rear accelerations of the vehicle are respectively detected for determining that the vehicle is running uphill in case the accelerator opening is not less than a specified opening and in case the acceleration in front and rear directions of the vehicle is not more than a specified level.

However, since the above method is not sufficient to accurately obtain gradients, there has been proposed in, for instance, Japanese Unexamined Patent Publication No. 145323/1992, a road surface gradient detecting device (A) for obtaining a gradient of the road surface on which the vehicle is running based on a difference between acceleration in front and rear directions of the vehicle as obtained through detection signals of a front and rear acceleration sensor mounted on the vehicle and running acceleration which is indicative of changes per unit times for the vehicle speed as obtained through pulse signals of a vehicle speed sensor. Such a device A is capable of detecting gradients of a road surface by diverting the front and rear acceleration sensor which is provided for suspension control, and upon utilizing detected gradients of the road surface as transmission control information for the automatic transmission, it is possible to improve controllability of transmission.

Japanese Unexamined Patent Publication No. 242862/1997 further describes a road surface gradient estimating apparatus (B). In this publication, it is made use of a relation given by vehicle driving torque=resistance torque when running on a flat road+acceleration resistance torque+gradient resistance torque, since a vehicle driving torque balances with a sum of resistance torque when running on a flat road, an acceleration resistance torque, and a gradient resistance torque. It is recited therein that the gradient resistance torque can be obtained upon obtaining the vehicle driving torque, the resistance torque when running on a flat road, and the acceleration resistance torque, so that it is possible to calculate a road surface gradient sin θ from the following equation:

$$T\theta = W \times G \times \sin\theta \times Rt$$

Here, T θ: gradient resistance torque
W: vehicle weight
G: gravitational acceleration
Rt: dynamic radius of tire While a conventional apparatus as disclosed in Japanese Unexamined Patent Publication No. 147304/1994 does not take it into consideration that acceleration resistance torque is changed in accordance with gear ratio, it is stated that the above apparatus B performs calculation of acceleration resistance torque even more accurately upon considering the gear ratio for accurately obtaining gradients of the road surface.

However, when using a front and rear acceleration sensor for detecting gradients of a road surface, the structure of a control circuit will become complicated which, in turn, leads to increased costs owing to the fact that a detection sensor is additionally required besides detectors related to an ABS device. Also in case gradients are obtained by using an acceleration sensor or on the basis of vehicle speed without using an acceleration sensor, it is difficult to accurately calculate the acceleration resistance torque.

SUMMARY OF THE INVENTION

In view of the above facts, it is an object of the present invention to provide an apparatus and method for judging road surface gradients and a program for judging gradients of the road surface on which a vehicle is running to thereby improve running performances through a simple structure.

In accordance with the present invention, there is provided an apparatus for judging road surface gradients including a speed detecting means for periodically detecting wheel speeds of four wheels of a vehicle, a vehicle body speed calculating means for obtaining a vehicle body speed of the vehicle, a slip rate calculating means for obtaining a slip rate, a means for calculating acceleration of the vehicle body for obtaining an acceleration of the vehicle body of the vehicle, a determining means for determining whether the acceleration of the vehicle body is within a specified range proximate to zero, and a gradient judging means for judging a gradient of a road surface on the basis of the determination of the determining means.

In accordance with the present invention, there is also provided a method for judging road surface gradients including the steps of: periodically detecting wheel speeds of four wheels of a vehicle, obtaining a vehicle body speed of the vehicle, obtaining a slip rate, obtaining an acceleration of the vehicle body of the vehicle, determining whether the acceleration of the vehicle body is within a specified range proximate to zero, and judging a gradient of a road surface on the basis of the determination.

Furthermore, in accordance with the present invention, there is further provided a program for judging gradients which makes a computer function as a vehicle body speed calculating means for obtaining a vehicle body speed of the vehicle, a slip rate calculating means for obtaining a slip rate, a means for calculating acceleration of the vehicle body for obtaining an acceleration of the vehicle body of the vehicle, a determining means for determining whether the acceleration of the vehicle body is within a specified range proximate to zero, and a gradient judging means for judging a gradient of a road surface on the basis of the determination of the determining means.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION

The apparatus and method for judging road surface gradients as well as the program for judging road surface gradients according to the present invention will now be explained on the basis of the accompanying drawings.

Figure 1:
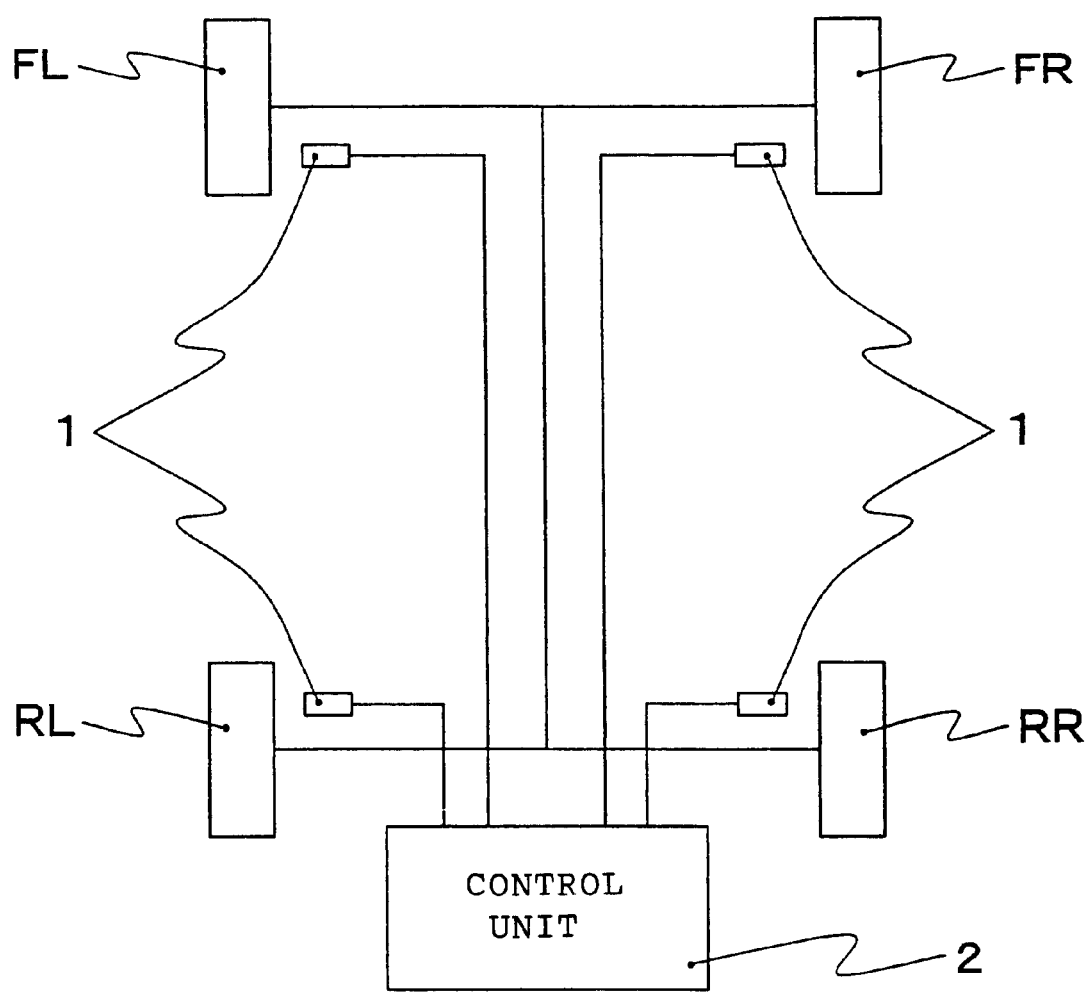
FIG. 1 is a block diagram showing one embodiment of an apparatus for judging road surface gradients according to the present invention.

As shown in FIG. 1, the apparatus for judging road surface gradients according to one embodiment of the present invention is equipped with speed detecting means 1 each of which is provided on four tires FL, FR, RL and RR (Wi, i=1 to 4, 1: a front left tire, 2: a front right tire, 3: a rear left tire, 4: a rear right tire), respectively, for periodically detecting rotational velocities of the wheel tires. Outputs of the speed detecting means 1 are transmitted to a control unit 2 which is a computer of an ABS and the like. Numeral 3 (see FIG. 2) denotes an initialization switch operated by a driver.

The speed detecting means 1 might be a wheel speed sensor for generating rotational pulses by using, for instance, an electromagnetic pickup and measuring the wheel speed on the basis of pulse numbers, or an angular velocity sensor in which power is generated by utilizing rotation such as in a dynamo and measuring the wheel speed through this voltage.

Figure 2:
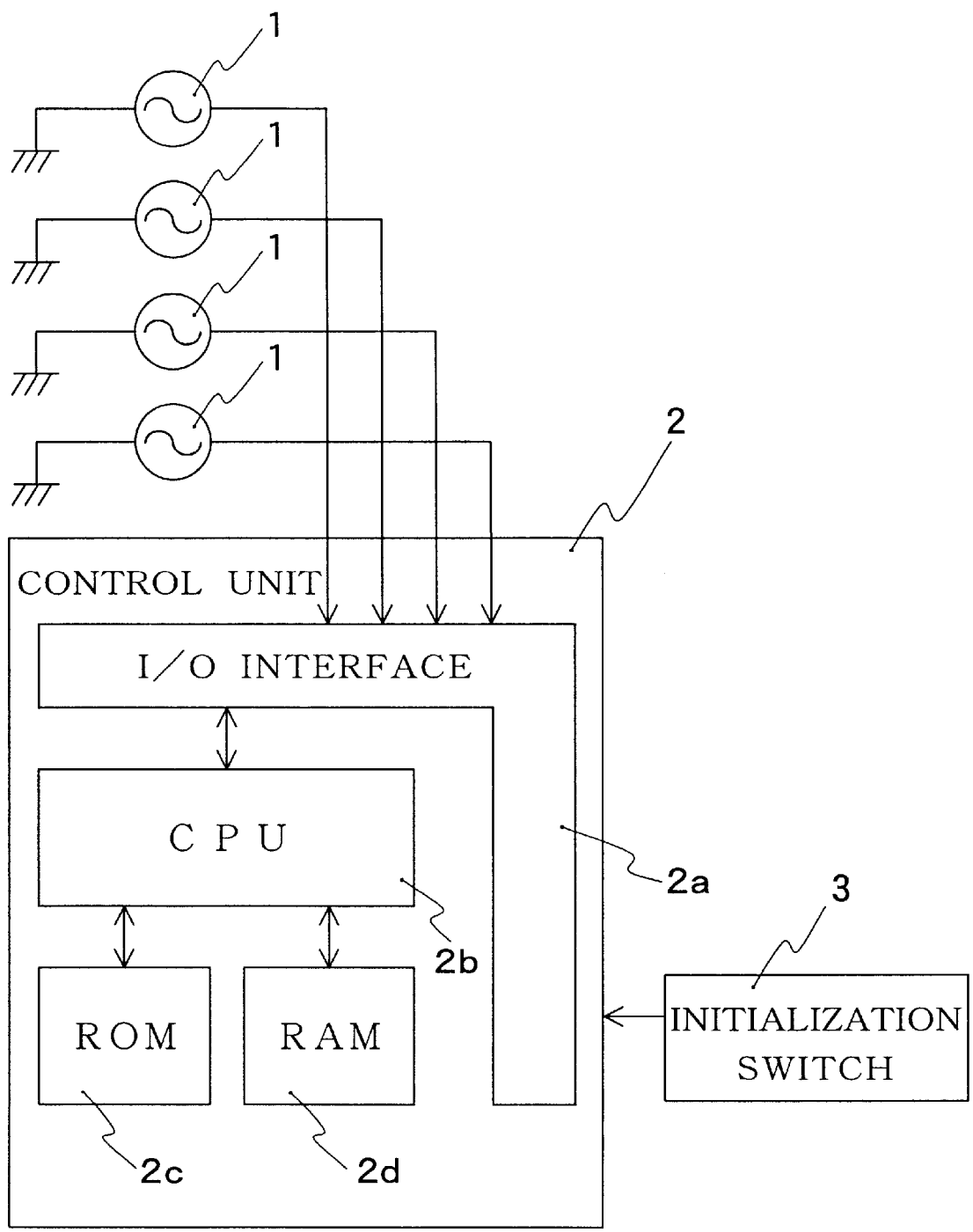
FIG. 2 is a block diagram showing electric arrangements of the apparatus for judging road surface gradients of FIG. 1.

As shown in FIG. 2, the control unit 2 includes an I/O interface 2a required for sending/receiving signals to/from an external device, a CPU 2b which functions as a center of calculation, a ROM 2c which stores a control operation program for the CPU 2b, and a RAM 2d into which data are temporally written and are read out therefrom when the CPU 2b performs control operations.

In the present embodiment, the control unit 2 includes the speed detecting means 1 for periodically detecting wheel speeds of the four wheels of the vehicle, the vehicle body speed calculating means for obtaining a vehicle body speed of the vehicle, a slip rate calculating means for obtaining a slip rate, a means for calculating acceleration of the vehicle body for obtaining an acceleration of the vehicle body of the vehicle, a determining means for determining whether the acceleration of the vehicle body is within a specified range proximate to zero, and a gradient judging means for judging a gradient of a road surface on the basis of the determination of the determining means.

The gradient judging means performs judgment of a road surface gradient, in case the acceleration of the vehicle body is within a specified range which is proximate to zero, on the basis of values of slip rates which are within the above range. Alternatively, when the acceleration of the vehicle is not within the above range within a specified period of time, linear regression of the slip rates and acceleration of the vehicle body is performed to judge the road surface gradient by using values of slip rates obtained when the acceleration of the vehicle body is zero.

According to the program of judging gradients of the present invention, the control unit 2 is made to function as a vehicle body speed calculating means for obtaining a vehicle body speed of the vehicle, a slip rate calculating means for obtaining a slip rate, a means for calculating acceleration of the vehicle body for obtaining an acceleration of the vehicle body of the vehicle, a determining means for determining whether the acceleration of the vehicle body is within a specified range proximate to zero, and a gradient judging means for judging a gradient of a road surface on the basis of the determining means.

The slip rate can be obtained on the basis of an average wheel speed of the driving wheels from among the wheel speeds and the vehicle body speed. More particularly, calculation can be performed in accordance with values of acceleration and deceleration speeds $Af_n$ of the vehicle. The slip rate $S_n$ might be obtained from the following two equations providing that, for instance, there will be no conditions in which the vehicle is in a slipping condition while accelerating wherein the driving wheels are locked ($Vd_n=0$, $Vf_n \neq 0$) or in which the vehicle is in a halted condition while decelerating wherein the driving wheels are performing wheel spinning ($Vf_n=0$, $Vd_n \neq 0$).

$$S_n=(Vf_n-Vd_n)/Vd_n, \text{ if } Af_n \geq 0 \text{ and } Vd_n \neq 0$$

$$S_n=(Vf_n-Vd_n)/Vf_n, \text{ if } Af_n < 0 \text{ and } Vf_n \neq 0$$

It is defined, in cases other than the above, that $S_n=1$ is satisfied.

Next, when the vehicle is running, force will act in a direction of preventing the running. This is the so-called running resistance. Such running resistance can be roughly divided into the following components.

(1) Acceleration resistance: A sum of inertia resistance for accelerating straight-ahead movements of the entire weight of the vehicle body and rotational movements of the engine and a transmission device, respectively, when the vehicle accelerates.

(2) Rolling resistance: Resistance caused when the tires roll.

(3) Air resistance: Resistance owing to force of air acting in a direction of preventing running of the vehicle.

(4) Gradient resistance: Component of force parallel to a sloped surface preventing uphill driving when the vehicle performs uphill running.

More particularly, running resistance=acceleration resistance+rolling resistance+air resistance+gradient resistance is satisfied. When the vehicle performs running, it is necessary to generate force (driving force) which is equivalent to the running resistance. A slip rate is required for obtaining such a driving force. It is known that, at the time of normal driving excluding special running conditions such as rapid start or drift driving, the larger the slip rate is, the larger the obtained driving force becomes in a linear manner. This indicates that an increase in the slip rate will result in a larger running resistance.

In the present invention, the degree of slip rates is used as a reference for determination. However, it will be necessary to discriminate which resistance out of the four resistances has caused the increase in the slip rate.

It has thus been paid attention to the fact in the present invention that the acceleration resistance cannot be accurately obtained so that in case the acceleration of the vehicle body is within a specified range which is proximate to zero, a road surface gradient is judged on the basis of a value for the slip rate within this range as already described above, and alternatively, in case the acceleration of the vehicle body is not within the above specified range within a specified period of time, linear regression is performed for the slip rate and the acceleration of the vehicle body for judging the road surface gradient on the basis of a value for the slip rate when the acceleration of the vehicle body is zero, and the acceleration resistance is accordingly deemed to be zero.

As for the rolling resistance, while such rolling resistance is dependent on types of tires or friction coefficients of the road surfaces, the amount of change thereof is small when compared to that of gradient resistance. While the rolling resistance tends to increase accompanying an increase in the vehicle body speed, it is known that it hardly changes unless the speed increases to approximately 100 km/h and more so that it is not necessary to pay particular attention thereto. However, road surface gradients might be more accurately determined when performing corrections through the vehicle body speed, for instance, by multiplying a coefficient which corresponds to the vehicle body speed.

As for the air resistance, the air resistance Ra is given by the following equation:

$$Ra = (C_x \times \rho \times A \times V^2)/2$$

Here, $C_x$: Air resistance coefficient

ρ: Air density

A: Frontal projected area of the vehicle

V: Relative speed with respect to air resistance

The air resistance coefficient $C_x$ and the frontal projected area of the vehicle A are values characteristic to the vehicle and might be preliminarily obtained and set as constants. Thus, the air resistance Ra is largely dependent on the vehicle body speed and is increased in proportion to a square of the vehicle body speed. It is accordingly possible to eliminate influences of the air resistance Ra by preliminarily obtaining correction coefficients for each vehicle and by performing correction of the slip rate in accordance with the vehicle speed.

In this manner, it is possible to determine that a change in the gradient of the road surface has occurred in case the slip rate has changed.

In the present embodiment, the wheel speed of the wheel tires of the four wheels is detected within a period of time, which is not more than 0.1 seconds, and preferably not more than 0.05 seconds.

While the vehicle body speed might be detected by employing a ground sensor (optical non-contact type speedometer or the like) on the basis of its detection signals, the present invention is not limited to this arrangement, and it is possible to regard the wheel speed of the following wheels to be the vehicle body speed in case the vehicle is a front-wheel drive car or a rear-wheel drive car. However, in case the wheel speed of the following wheels is regarded to be the vehicle body speed, it is necessary to reject data obtained during braking. This is because the vehicle body speed cannot be precisely obtained since braking force will also act on the following wheels during braking. It should be noted that it is further possible to obtain the vehicle body speed by integrating the acceleration of the vehicle body of the vehicle.

While the vehicle body speed of the vehicle might be obtained by using an acceleration sensor on the basis of its detection signals, the present invention is not limited to this arrangement, and it is possible to obtain the acceleration of the vehicle body on the basis of a value obtained by differentiating the wheel speed of the following wheels in case the vehicle is a front-wheel drive car or a rear-wheel drive car.

In the present embodiment, the slip rate and the acceleration of the vehicle body of the vehicle are obtained by a moving average process per sampling time as an average value of data obtained for a specified period of time, for instance, not less than 0.1 second, and a relational equation between the slip rate and the acceleration of the vehicle body of the vehicle is obtained on the basis of a value obtained through moving averaging (a specified number of slip rates and accelerations of the vehicle body of the vehicle).

By further using the moving averaged data of the slip rates and the accelerations of the vehicle body of the vehicle, for instance, at least five data, relative linear regression coefficients and correlation coefficients of the slip rates and the accelerations of the vehicle body of the vehicle are obtained.

A slip rate is obtained when the moving averaged acceleration of the vehicle body is within a specified range which is proximate to zero, for instance, ±0.01 G (G denotes gravitational acceleration).

In case a plurality of slip rates which satisfy the condition that the acceleration of the vehicle body is proximate to zero are found within the specified period of time, an average of these slip rates is obtained.

This slip rate is compared with a slip rate which has been preliminarily obtained when running on flat road for judging the gradient of the road surface. In case, for instance, the obtained slip rate is larger than the preliminarily set slip rate, it is determined that the vehicle is running uphill. On the other hand, in case it is smaller, it is determined that the vehicle is running downhill. It is alternatively possible to divide the degree of the slip rates into several stages for discriminating between steep uphill movements or gentle uphill movements.

On the other hand, in case no acceleration data are found within the specified period of time, for instance, within two seconds, which fall within the specified range, for instance, ±0.01 G, linear regression of the data for the slip rate and the acceleration of the vehicle body of the vehicle is performed for obtaining a value for the slip rate when the acceleration of the vehicle body is zero, and the gradient of the road surface is judged from the value of the slip rate when the acceleration of the vehicle body is zero. However, in case the correlation coefficient is less than a specified value, for instance, 0.8 even upon performing linear regression, the obtained slip rate is rejected and no judgment is performed.

It should be noted that a judged slip rate JSL is obtained upon correcting a zero slip rate ZSL by using the correction equation below in case the vehicle body speed of the vehicle is not less than 60 km/h. No corrections are performed in case the speed is less than 60 km/h. This is because the air resistance is quite small and ignorable in case the speed is less than 60 km/h (16.7 m/s).

$$JSL = ZSL - \alpha \times (v - 16.7)$$

Here, α is a constant and v is a vehicle speed (m/s). The constant α might be obtained by preliminarily performing running on a flat road at respective speeds for each vehicle.

Operations of the apparatus for judging road surface gradients according to the present embodiment will now be explained along steps (1) to (10).

(1) Wheel speeds ($V1_n$, $V2_n$, $V3_n$, $V4_n$) are calculated from the respective rotational velocities of the four wheel tires Wi of the vehicle.

For instance, wheel speed data of an arbitrary point of time for the respective wheel tires Wi as obtained through a sensor such as an ABS sensor are defined to be the wheel speeds $V1_n$, $V2_n$, $V3_n$, $V4_n$.

(2) Then, average wheel speeds ($Vf_n$, $Vd_n$) of the following wheels and the driving wheels are calculated.

In the case of front-wheel drive, the average wheel speeds ($Vf_n$, $Vd_n$) of the following wheels and the driving wheels are obtained through the following equations (1), (2):

$$Vf_n = (V3_n + V4_n)/2 \qquad (1)$$

$$Vd_n = (V1_n + V2_n)/2 \qquad (2)$$

(3) The acceleration of the vehicle body of the vehicle (that is, an average wheel acceleration of the following wheels) $Af_n$ is calculated.

The acceleration of the vehicle body of the vehicle $Af_n$ is given by the following equation (3) on the basis of the last but one wheel speed $Vf_{n-1}$ with respect to the average wheel speed $Vf_n$ of the following wheels.

$$Af_n = (Vf_n - Vf_{n-1})/\Delta t/g \qquad (3)$$

Here, $\Delta t$ denotes a time interval (sampling time) between the wheel speeds $Vf_n$ and $Vf_{n-1}$ as calculated from the wheel speed data, and g is the gravitational acceleration. For the purpose of reducing variations in data and of performing judgment in a short period of time, the sampling time is required to be not more than 0.1 second, and more particularly not more than 0.05 second.

(4) The slip rate $S_n$ is calculated through the following equation (4) by using a ratio of front and rear wheels between the average wheel speed $Vd_n$ of the driving wheels and the vehicle body speed (average wheel speed $Vf_n$ of the following wheels) from among the wheel speeds:

$$S_n = Vd_n/Vf_n \qquad (4)$$

(5) The data for the slip rate and the acceleration of the vehicle body of the vehicle are then subject to moving averaging process per each sampling time.

When performing linear regression, a certain amount of data are required else the reliability of the obtained regression coefficient will be inferior. Thus, data are sampled at short sampling times of several tens of ms and moving averaging of these data of large variations obtained during this sampling time is performed for reducing the variations in the data without decreasing the number of data.

The slip rates are obtained as follows:

$$MS_n = (S_1 + S_2 + \ldots + S_n)/N \qquad (5)$$

$$MS_{n+1} = (S_2 + S_3 + \ldots + S_{n+1})/N \qquad (6)$$

$$MS_{n+2} = (S_3 + S_4 + \ldots + S_{n+2})/N \qquad (7)$$

The accelerations of the vehicle body of the vehicle are obtained as follows:

$$MAf_n = (Af_1 + Af_2 + \ldots + Af_n)/N \qquad (8)$$

$$MAf_{n+1} = (Af_2 + Af_3 + \ldots + Af_{n+1})/N \qquad (9)$$

$$MAf_{n+2} = (Af_3 + Af_4 + \ldots + Af_{n+2})/N \qquad (10)$$

(6) The gradient of the road surface is judged in case the acceleration of the vehicle body is within a specified range proximate to zero, for instance, ±0.005 G, on the basis of values of the slip rate which are within the above range.

(7) In case the acceleration of the vehicle body is not within the specified range of, for instance, ±0.005 G within the specified period of time of, for instance, 2 seconds, linear regression is performed for the slip rates and the acceleration of the vehicle body, and the gradient of the road surface is judged on the basis of the values of the slip rates when the acceleration of the vehicle body is zero.

(8) Relative linear regression coefficients of the slip rate and the accelerations of the vehicle body, that is, a regression coefficient K1 of the slip rate to the acceleration of the vehicle body of the vehicle and a regression coefficient K2 of the acceleration of the vehicle body of the vehicle to the slip rate are obtained from the following equations (11) and (12):

$$K1 = \frac{\sum (MAf_i \times MS_i) - N \times \overline{MAf} \times \overline{MS}}{\sum MAf_i^2 - N \times \overline{MAf} \times \overline{MAf}} \qquad (11)$$

$$K2 = \frac{\sum (MAf_i \times MS_i) - N \times \overline{MAf} \times \overline{MS}}{\sum MS_i^2 - N \times \overline{MS} \times \overline{MS}} \qquad (12)$$

Here, $\overline{MS}$ and $\overline{MAf}$ respectively denote average values of N-number of slip rates and acceleration/deceleration of the vehicle obtained through moving averaging. It can be understood from Table 1 that the regression coefficient K1 is 0.12 and the regression coefficient K2 7.27.

TABLE 1

| N | MAf | MS | MAf × MS | MAf² | MS² |
|---|---|---|---|---|---|
| 1 | 0.0270 | 0.0075 | 0.000203 | 0.000729 | 0.00005625 |
| 2 | 0.0260 | 0.0073 | 0.00019 | 0.000676 | 0.00005329 |
| 3 | 0.0250 | 0.0073 | 0.000183 | 0.000625 | 0.00005329 |
| 4 | 0.0240 | 0.0071 | 0.00017 | 0.000576 | 0.00005041 |
| 5 | 0.0260 | 0.0074 | 0.000192 | 0.000676 | 0.00005476 |
| Total | 0.128 | 0.0366 | 0.0009376 | 0.003282 | 0.000268 |
| Average | 0.0256 | 0.00732 | — | | |

The correlation coefficient R is given by $$R = K1 \times K2 \qquad (13)$$

In case this correlation coefficient is not less than a specified value, for instance, 0.8, the value of the linear regression coefficient K1 is updated.

The relationship between the slip rate and the acceleration of the vehicle body of the vehicle is identical to a $\mu$-s curve between a general tire and a road surface. Obtaining the regression coefficients K1, K2 means that a gradient of the $\mu$-s curve has been obtained. While the $\mu$-s curve is inherently curved, it is substantially linear in a range of the slip rate which occurs at the time of actual running. That is, the $\mu$-s curve might be given by an equation y=aX+b. The coefficient a at this time indicates the regression coefficients (K1, K2), i.e., a linear gradient. Depending on whether y represents the slip rate or the acceleration, either a=K1 or a=K2 is satisfied. In the present embodiment, the gradient of the road surface is judged by using the value of K1 in which y denotes a slip rate. The road surface gradient might also be judged on the basis of the regression coefficient K2 as well.

The reason for obtaining a correlation coefficient R is to determine whether the obtained value for the regression coefficient is appropriate or not. That is, in case the value of the correlation coefficient R is large, a correlation exists between the slip rate and the acceleration and the obtained regression coefficient is appropriate, while in case the value of the correlation R is small, no correlation exists between both members so that the obtained regression coefficient is inappropriate and accordingly the gradient of the road surface is not judged on the basis of such values.

(9) The obtained slip rate is corrected in accordance with the vehicle body speed of the vehicle.

(10) The slip rate is compared with a slip rate which has been preliminarily obtained when running on a flat road for judging the road surface.

The judged gradient of the road surface is used as transmission control information for an automatic transmission for the purpose of improving controllability of transmission. For judging a decrease in air-pressure or a slippery road surface on the basis of the wheel speed alone, such gradients are used in a device for detecting decrease in tire air-pressure (DWS) or a device for judging road surface conditions. For instance, when the gradient of the road surface is known, it is possible to improve the detection accuracy of decompressed conditions or road surface conditions by performing corrections or rejections during uphill or downhill running. The driver is accordingly alarmed of information related to such decompressed conditions or road surface conditions (such as slippery).

While the present invention will now be explained on the basis of an example thereof, the present invention is not to be limited to this example only.

EXAMPLE

Figure 3:
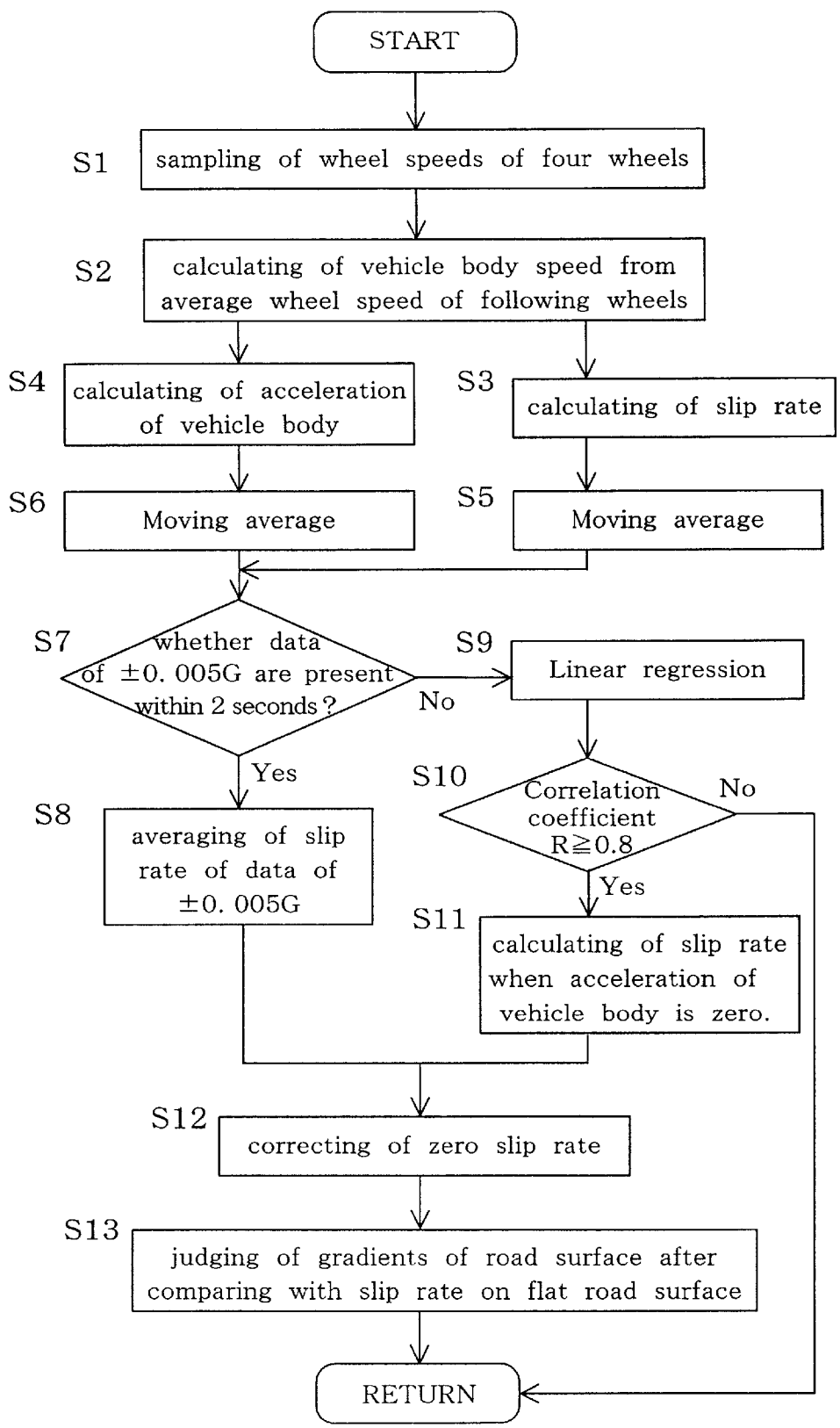
FIG. 3 is a flowchart of a logic for judging road surface gradients.

A rear-wheel drive car was made to run on a flat road surface R1, or uphill or downhill (gentle uphill running R2, steep uphill running R3, gentle downhill running R4), respectively. The wheel speeds of the four wheels were sampled during running as shown in FIG. 3 (Step S1). The sampling time for the wheel speeds of the wheels was set to 40 ms since a sampling time of, for instance, 1 second was too long to obtain a large number of data while eliminating variations or measuring errors.

An average wheel speed of the front wheels, which are the following wheels, was set to be the vehicle body speed to thus obtain a slip rate (ratio of front and rear wheels) (Steps S2, S3). The vehicle body speed was differentiated by the sampling time for obtaining an acceleration of the vehicle body (Step S4).

The slip rate and acceleration of the vehicle body were then subject to moving averaging processes (Steps S5, S6).

Thereafter, it was determined whether data of which the acceleration of the vehicle body within the specified range of ±0.005 G were present within 2 seconds or not (Step S7). If the data were within the specified range, an averaged slip rate corresponding to the acceleration of the vehicle body was defined to be a zero slip rate (ZSL) (Step S8).

In case no acceleration of the vehicle body were found in the above range of ±0.005 G, it was determined whether a correlation coefficient was not less than 0.8 after performing linear regression of data of the acceleration of the vehicle body and the slip rate (Steps S9, S10). In case the correlation coefficient was not less than 0.8, a slip rate was obtained when the acceleration of the vehicle body was zero to set this as a zero slip rate (ZSL) (Step S11). In case the correlation coefficient was less than 0.8, judgment of gradients of the road surface was inhibited.

In case the vehicle body speed was not less than 60 km/h, the zero slip rate (ZSL) was corrected on the basis of the above-described correction equation JSL=ZSL−α×(v−16.7) (Step S12) for obtaining a judged slip rate (JSL).

Figure 4:
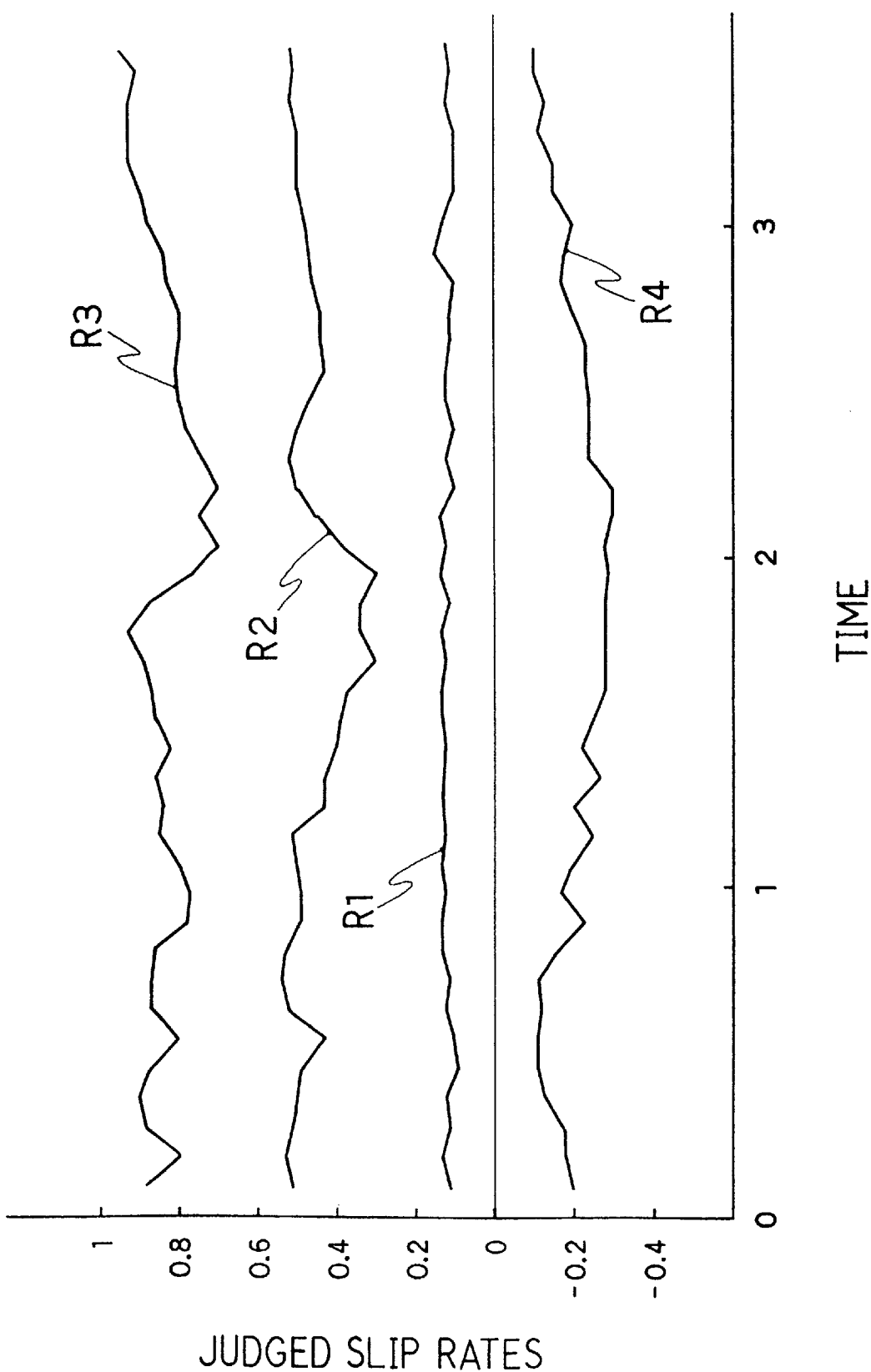
FIG. 4 is a view showing time-varying changes in judged slip rates.

Time-varying changes in the judged slip rates (JSL) were checked for the flat surface road R1, the gentle uphill running R2, the steep uphill running R3 and the gentle downhill running R4 to compare the slip rate when running on the flat road surface R1 with other slip rates for judging gradients of the road surface (Step S13). As a result, differences in gradients of the road surfaces are accurately shown in FIG. 4, and it can be understood that, by comparing with the slip rate when running on the flat road surface R1, it can be judged that, depending on the degree, the vehicle was running a steep uphill road R3 or a gentle uphill road R2 in case the slip rate is larger than this slip rate when running on the flat road surface R1 whereas it was running on a gentle downhill road R4 in case the slip rate is smaller.

As explained so far, according to the present invention, the running performance and the safety of driving can be improved in case the vehicle judges gradients of road surface for utilizing the results as transmission control information for an automatic transmission, a device for detecting decrease in tire air-pressure (DWS) or a device for judging road surface conditions. The gradients of road surfaces might be judged without using various sensors but only on the basis of information which can be obtained from a speed detecting means for detecting wheel speeds. Thus, in case the vehicle is equipped with an ABS, it is possible to judge gradients of road surface without the necessity of any additional sensors.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An apparatus for judging road surface gradients comprising:
   a speed detecting means for periodically detecting wheel speeds of four wheels of a vehicle;
   a vehicle body speed calculating means for obtaining a vehicle body speed of the vehicle;
   a slip rate calculating means for obtaining a slip rate;
   a means for calculating acceleration of the vehicle body for obtaining an acceleration of the vehicle body of the vehicle;
   a determining means for determining whether the acceleration of the vehicle body is within a specified range; and
   a gradient judging means for judging a gradient of a road surface depending on the determination of the determining means.

2. The apparatus of claim 1, wherein the gradient judging means judges a road surface gradient, in case the acceleration of the vehicle body is within a specified range which is proximate to zero, on the basis of values of slip rates which are within the specified range.

3. The apparatus of claim 1, wherein the gradient judging means performs linear regression of the slip rates and acceleration of the vehicle body to judge a road surface gradient by using values of slip rates obtained when the acceleration of the vehicle body is zero, in case the acceleration of the vehicle is not within a specified range which is proximate to zero within a specified period of time.

4. The apparatus of anyone of claims 2 to 3, wherein the obtained slip rate is corrected in accordance with the vehicle body speed of the vehicle.

5. The apparatus of claim 2, wherein the gradient judging means compares an average of the slip rates which are within the specified range with a slip rate which has been obtained when running on a flat road.

6. A method for judging road surface gradients comprising the steps of:

periodically detecting wheel speeds of four wheels of a vehicle;

obtaining a vehicle body speed of the vehicle;

obtaining a slip rate;

obtaining an acceleration of the vehicle body of the vehicle;

determining whether the acceleration of the vehicle body is within a specified range proximate to zero; and judging a gradient of a road surface depending on the determination.

7. The method of claim 6, wherein a road surface gradient is judged, in case the acceleration of the vehicle body is within a specified range which is proximate to zero, on the basis of values of slip rates which are within the specified range.

8. The method of claim 6, wherein a road surface gradient is judged by performing linear regression of the slip rates and acceleration of the vehicle body to judge the road surface gradient by using values of slip rates obtained when the acceleration of the vehicle body is zero, in case the acceleration of the vehicle is not within a specified range which is proximate to zero within a specified period of time.

9. The method of any one of claims 7 to 8, wherein the obtained slip rate is corrected in accordance with the vehicle body speed of the vehicle.

10. The method of claim 7, wherein a road surface gradient is judged by comparing an average of the slip rates which are within the specified range with a slip rate which has been obtained when running on a flat road.

11. A computer-readable medium embodied with a program for judging gradients which makes a computer function as a vehicle body speed calculating means for obtaining a vehicle body speed of the vehicle, a slip rate calculating means for obtaining a slip rate, a means for calculating acceleration of the vehicle body for obtaining an acceleration of the vehicle body of the vehicle, a determining means for determining whether the acceleration of the vehicle body is within a specified range proximate to zero, and a gradient judging means for judging a gradient of a road surface depending on the determination of the determining means.

12. The computer-readable medium of claim 11, wherein the gradient judging means judges a road surface gradient, in case the acceleration of the vehicle body is within a specified range which is proximate to zero, on the basis of values of slip rates which are within the specified range.

13. The computer-readable medium of claim 11, wherein the gradient judging means performs linear regression of the slip rates and acceleration of the vehicle body to judge a road surface gradient by using values of slip rates obtained when the acceleration of the vehicle body is zero, in case the acceleration of the vehicle is not within a specified range which is proximate to zero within a specified period of time.

14. The computer-readable medium of any one of claims 12 to 13, wherein the obtained slip rate is corrected in accordance with the vehicle body speed of the vehicle.

15. The computer readable medium of claim 12, wherein the gradient judging means compares an average of the slip rates which are within the specified range with a slip rate which has been obtained when running on a flat road.

* * * * *